US010566851B2

(12) United States Patent
Plasmans et al.

(10) Patent No.: US 10,566,851 B2
(45) Date of Patent: Feb. 18, 2020

(54) SYSTEM AND METHOD OF DETERMINING THE LOCATION OF AN OCCUPIED PHYSICAL SPACE

(71) Applicant: Zens Group B.V., Eindhoven (NL)

(72) Inventors: Johannes Barnardus Plasmans, Bladel (NL); Ronald Hans Van Der Voort, Helmond (NL)

(73) Assignee: Zens Group B.V., Eindhoven (NL)

( * ) Notice: Subject to any disclaimer, the term of this patent is extended or adjusted under 35 U.S.C. 154(b) by 23 days.

(21) Appl. No.: 16/069,356

(22) PCT Filed: Jan. 11, 2017

(86) PCT No.: PCT/NL2017/050013
§ 371 (c)(1),
(2) Date: Jul. 11, 2018

(87) PCT Pub. No.: WO2017/123088
PCT Pub. Date: Jul. 20, 2017

(65) Prior Publication Data
US 2019/0027975 A1 Jan. 24, 2019

(30) Foreign Application Priority Data
Jan. 11, 2016 (NL) ...................................... 2016079

(51) Int. Cl.
*H04W 4/02* (2018.01)
*H02J 50/80* (2016.01)
(Continued)

(52) U.S. Cl.
CPC .............. *H02J 50/80* (2016.02); *H02J 7/025* (2013.01); *H02J 50/10* (2016.02); *H02J 50/60* (2016.02);
(Continued)

(58) Field of Classification Search
None
See application file for complete search history.

(56) References Cited

U.S. PATENT DOCUMENTS 7,746,226 B2 * 6/2010 Cohen ............... H04M 1/72519
340/3.7
8,847,545 B2 * 9/2014 Williams ................ H04M 1/04
320/106
(Continued)

FOREIGN PATENT DOCUMENTS

KR 20140030710 A 3/2014

OTHER PUBLICATIONS

Andy Cavallini, "iBeacons Bible 1.0," Dec. 12, 2013, pp. 1-15 (URL:https:jjmeetingofideas.files.wordpress.com/2013/ 12/ibeacons-bible-1-0.pdf (retrieved Nov. 4, 2015)).
(Continued)

*Primary Examiner* — Tuan A Tran
(74) *Attorney, Agent, or Firm* — McDonnell Boehnen Hulbert & Berghoff LLP

(57) ABSTRACT

The application relates to a method and system for determining the occupancy of one or more physical spaces. The system comprises one or more charging devices configured to be arranged at the one or more physical spaces, each of the charging devices comprising a charging unit configured for wireless power transfer to a mobile telecommunication device when the mobile telecommunication device is placed in close proximity to the charging unit, a localisation unit configured to broadcast an information signal comprising identifying information of the localisation unit to the mobile telecommunication device; and a controller configured to determine the location of an occupied physical space upon
(Continued)

detection of the charging of the mobile telecommunication device, wherein the location is determined based on the broadcast signal.

20 Claims, 6 Drawing Sheets

(51) Int. Cl.
    *H02J 50/10*        (2016.01)
    *H02J 50/90*        (2016.01)
    *H02J 7/02*         (2016.01)
    *H02J 50/60*        (2016.01)
    *H02J 7/00*         (2006.01)

(52) U.S. Cl.
    CPC ....... *H02J 50/90* (2016.02); *H02J 2007/0096* (2013.01)

(56) References Cited

U.S. PATENT DOCUMENTS

| | | | |
|---|---|---|---|
| 9,036,545 B2 * | 5/2015 | Lindner | H04W 4/08 370/328 |
| 9,386,063 B2 * | 7/2016 | McMahon | H04L 67/1097 |
| 10,223,717 B1 * | 3/2019 | Bell | G06Q 30/04 |
| 10,244,462 B2 * | 3/2019 | Kang | H04W 4/70 |
| 10,291,066 B1 * | 5/2019 | Leabman | H02J 7/025 |
| 2008/0315990 A1 * | 12/2008 | Komatsu | H04M 3/42357 340/5.81 |
| 2014/0094116 A1 | 4/2014 | Walley et al. | |
| 2014/0128107 A1 * | 5/2014 | An | G01S 5/12 455/457 |
| 2014/0285317 A1 | 9/2014 | Shimizu et al. | |
| 2015/0128194 A1 * | 5/2015 | Kuang | H04N 21/41407 725/81 |

OTHER PUBLICATIONS

PCT International Search Report and Written Opinion of the International Searching Authority for corresponding PCT International Application No. PCT/NL2017/050013, dated Apr. 4, 2017, 12 pages.

PCT International Preliminary Report on Patentability for corresponding PCT International Application No. PCT/NL2017/050013, dated Mar. 29, 2018, 6 pages.

* cited by examiner

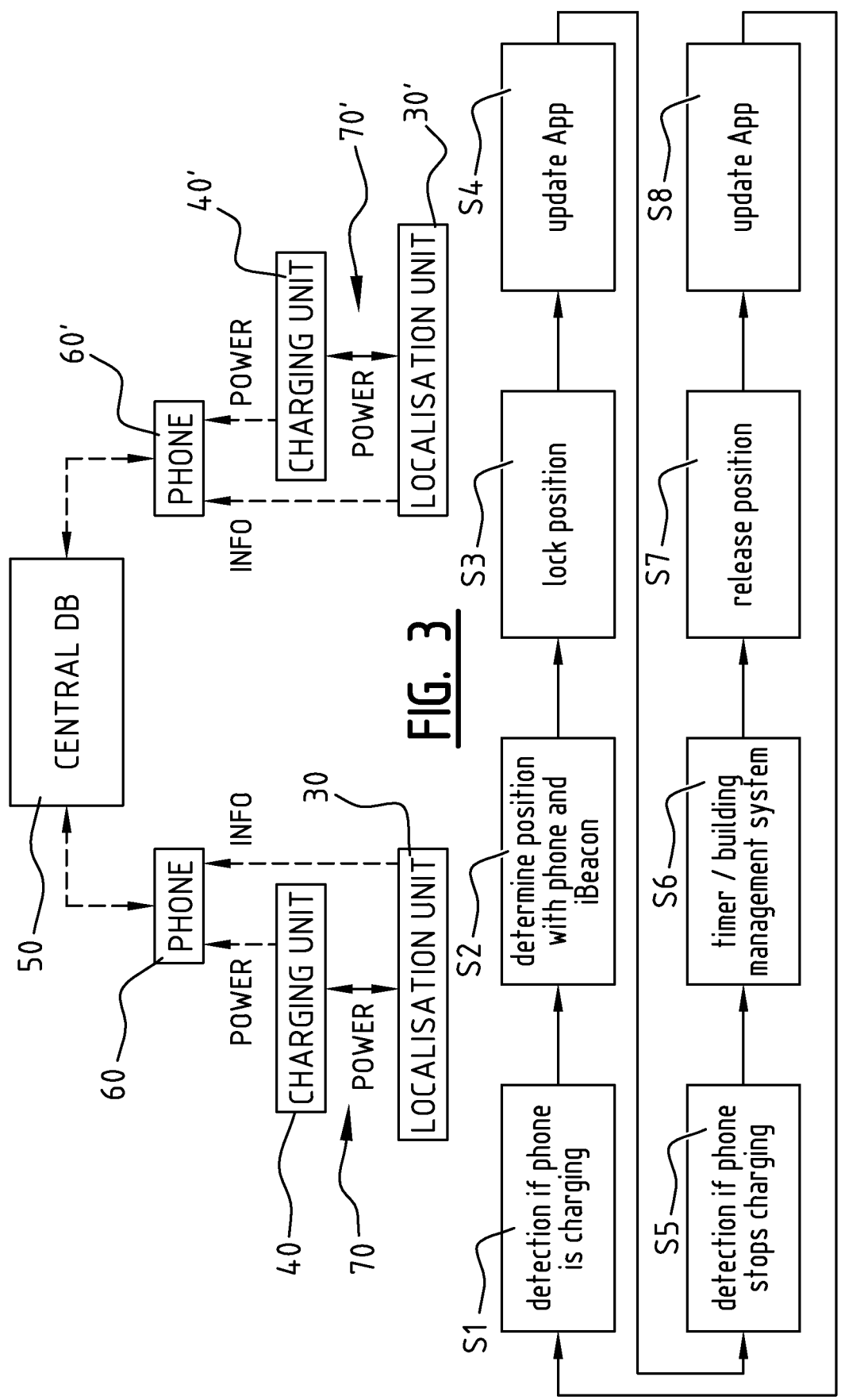

SYSTEM AND METHOD OF DETERMINING THE LOCATION OF AN OCCUPIED PHYSICAL SPACE

This application is a National Stage Application of International Patent Application No. PCT/NL2017/050013, filed Jan. 11, 2017, which claims the benefit of, and priority to, Netherlands Patent Application No. 2016079, filed Jan. 11, 2016, the contents of these applications being incorporated entirely herein by reference.

The invention concerns a system and method of determining the location of one or more occupied or unoccupied physical spaces.

Mobile telecommunication devices such as mobile phones have gradually produced a much less localized world. When you can be reached anywhere, there is no real need to be in a predictable or known position. Furthermore information may be accessed and used anywhere and at any point in time. Systems are also becoming increasingly intelligent: this is often referred to as "the internet of things", but other examples may be smart sensors, smart environments, etc.

One of the results of this is that workplaces increasingly make use of flexible workstations, with employees working at different desks and sometimes in different buildings on different days or sometimes even at different times of the day.

A drawback of these systems may be that it is difficult to keep track of people. Another difficulty may be that in crowded office situations it may be difficult to find an unoccupied workspace. Systems exist in which people self-report their current position so that the system can keep track of whether or not specific workspaces are occupied, but these systems are an imposition on users and susceptible to human error. Furthermore, these systems may easily be abused by persons wanting to reserve a workplace even if they are not using it. Furthermore, many of the known systems merely register if a workplace is occupied or not. In these systems, finding an unoccupied workplace may be possible, but finding a specific person is usually not.

Yet other systems, such as the system known from US 2009-0193217 A, use sensors to detect whether a workstation is or is not occupied. This system has several drawbacks. First of all, it does not identify who is occupying a workstation. Second of all, the sensors may have a hard time distinguishing between someone truly occupying a work station and someone just stopping by for a conversation. Additionally, the system requires the installment of a number of occupancy sensing sensors, provided with a battery or self-powering mechanism and a radio for enabling wireless interactions. In practice the known system provides a rather unreliable assessment of the occupancy of a workstation, is complex and expensive and/or does not provide useful information about the persons occupying the workstations.

It is therefore an object of the invention to provide a system and method of determining the location of one or more occupied or unoccupied physical spaces, for instance a system and method of determining the occupancy of one or more physical spaces, such as work spaces, wherein at least one of the above-identified drawbacks has been reduced. It is a further object to provide a system and method of determining the occupancy of one or more physical spaces that is both more accurate and more reliable than existing systems, preferably wherein not merely occupancy but also the location of a plurality of users may be registered.

An added problem of flexible workstations may be that employees need to bring with them everything they need to be able to work. One somewhat cumbersome object an employee may need to take with them is a charger for a smart phone or another mobile telecommunication device, and these need to be recharged frequently with intensive use. It is therefore also an object of the invention to provide a workstation for flexible use that reduces the number of objects the employee needs to transport from one work station to another.

At least one of the above objects and/or other objects may be at least partially achieved with a system according to the preamble, the system comprising:

one or more charging devices configured to be arranged at the one or more physical spaces, each of the charging devices comprising a charging unit configured for wireless power transfer to a mobile telecommunication device when the mobile telecommunication device is coupled to the charging unit;

one or more localisation units associated with each of the charging devices, wherein each of the localisation unit is configured to broadcast an information signal comprising identifying information of the localisation unit to the mobile telecommunication device;

a controller configured to determine the location of an occupied physical space upon detection of the coupling between the mobile telecommunication device and the charging device, wherein the location is determined based on the identifying information in the broadcast signal received by the mobile telecommunication device.

The system may comprise the mobile telecommunication device as well. In embodiments the controller, for instance the controller of the mobile telecommunication device, is configured to start determining the location of an occupied space at the moment the coupling between the mobile telecommunication device and the charging device belonging to that space or the charging of the mobile telecommunication device is detected.

The coupling may involve direct physical contact between the mobile telecommunication device and the charging devices. In other embodiments, however, there is no direct physical contact. The charging device may be a wireless charging device configured to charge the mobile telecommunication device in a wireless manner, as will be explained hereafter. In the latter case the mobile telecommunication device only needs to be arranged in close proximity to the charging unit, for instance within a range of several centimetres. Furthermore, the association between the localisation unit and the charging device may be a physical connection when the localisation unit is mounted to the charging device. In still further embodiments the association involves an electrical connection between the localisation unit and the charging device. The charging device can be configured to send a trigger signal (the signal being indicative of the coupling of between the mobile telecommunication device and the charging device or indicative of the start of the charging by the charging device) to the localisation unit and the localisation unit can be configured to receive the trigger signal and start broadcasting the information signal as soon as the trigger signal has been received. The trigger signal may be forwarded wirelessly or through a wired connection from the charging device to the localisation device. In embodiments both the localisation unit and charging device may be arranged in one and same housing (wherein they are not necessarily connected to each other) or the localisation unit may be arranged at some distance relative to the charging device. Relevant here is that each localisation unit bears a one-on-one relationship to a charging device.

The controller determines that a space is occupied only after the charging of a mobile telecommunication device is detected, or at the very least after a coupling between a charging device and a mobile telecommunication device is detected, which happens even if/when a device for mobile telecommunication happens to be fully charged.

The one or more charging devices are arranged at the physical space (i.e. arranged at a suitable location inside the space, mounted to a piece of furniture positioned inside the space, for instance mounted beneath a table top, etc.).

In an embodiment the system comprises a storage medium, for instance one or more memories, disks, etc., on which relationships between identifying information of the localisation units and geographic location information about the geographical locations of the charging devices associated with the localisation units are stored. The controller may be configured to determine the location of an occupied physical space based on the stored relationships. Upon receipt of the broadcast signal by the mobile telecommunication device, the controller (located in the mobile telecommunication device or in another system wirelessly connected to the mobile telecommunication device, such as a remote server, for instance forming a central registration system) compares the identifying information in the received broadcast signal with the stored relationships and determines from this comparison the location of the space that has just been occupied. Please note that the geographic information is information that is representative of the spatial location. Geographic information is not limited to direct spatial information such as coordinates (for instance, x, y, and z coordinates representing, longitude, latitude, and elevation, respectively), but could also involve indirect information, for instance codes that represent known geographic locations, for instance the locations on a map. In embodiments of the invention the geographic information relates to the location of the associated charging device. In other embodiments the geographic information relates to the location of the localisation device.

In embodiments of the invention the system comprises a central registration system (for instance one or more servers, connected to the internet). The central registration system may include a storage medium (for instance a storage medium of the one or more servers and/or an external cloud storage). A database comprising the identifying information of a plurality of localisation units as well as further information about the localisation units may be stored on the storage medium.

As mentioned above the controller (and/or the storage medium) may be arranged in the mobile telecommunication device. In other embodiments the controller (and/or the storage medium) are provided as part of the central registration system. In still other embodiments the controller is partly present in the mobile telecommunication device and partly in the central registration system.

In an embodiment the charging device is configured to generate a trigger signal when a coupling between the charging device and the mobile telecommunication device is detected and/or when the charging device actually starts charging the mobile telecommunication device. In an alternate embodiment (which may be combined with the previous embodiment), mobile telecommunication device is configured to generate the trigger signal when a coupling between the charging device and the mobile telecommunication device is detected and/or when the mobile telecommunication device detects the charging device to start charging the mobile telecommunication device.

In further embodiments wherein the system includes a mobile telecommunication device, the mobile telecommunication device is configured to detect the trigger signal (for instance generated by the mobile telecommunication device or generated by the charging device and forwarded to the mobile telecommunication device). Only upon detection of the trigger signal by the mobile telecommunication device, the mobile telecommunication device will start determining which localisation device is closest to the current position of the mobile telecommunication device (which position necessarily is close to the charging device since the mobile telecommunication device is being charged and the distance between the mobile telecommunication device and charging device is small enough to enable the charging device to charge the mobile telecommunication device wirelessly). In case a plurality of localisation devices (for instance localisation devices belonging to various spaces) are broadcasting information signals, the mobile telecommunication device may determine which localisation device is positioned closest to the mobile telecommunication device by comparing the signal strengths of the received information signals. However, alternative or additional methods of determining the nearest localisation device are well within the reach of the ordinary person skilled in the art.

In embodiments of the present disclosure at least one of the localisation units (or each of the localisation units) is configured to continuously broadcast the information signal. There are also embodiments wherein at least one of the localisation units are configured to start broadcasting the information signal only upon detection of a trigger signal (for instance directly after detection or within a relative short time period, for instance a couple of seconds) (wherein the trigger signal is generated only when a mobile telecommunication device is coupled to the charging device and/or only when a mobile telecommunication device is actually being charged by the charging device). In all of these embodiments the risk that the controller incorrectly determines a space to be occupied while in fact it is not, is relatively small. For instance, even in case a person only shortly passes an unoccupied space or accidentally finds himself for a while close to an unoccupied space, the controller will only determine that the space is occupied when the mobile telecommunication device is sufficiently close to the charging device so that a trigger signal is generated. Furthermore, in embodiments wherein localisation units are configured to start broadcasting the information signal only upon detection of a trigger signal (and wherein no information signal is being broadcast if no trigger signal has been detected), the risk of inadvertently determining a space to be occupied while in reality it is not, is even smaller since the localisation units of nearby spaces that have been occupied and therefore have started broadcasting information signals, have already been registered (determined) by the controller as belonging to occupied spaces and their received information signals can therefore be disregarded.

Charging devices, in particular wireless charging devices, are often capable of detecting that a mobile telecommunication device is within charging range, and of generating this trigger signal. Mobile telecommunication devices are already capable of detecting this coupling and generating the trigger signal: it is often depicted as a battery with a lightning symbol inside it.

Whether the charging device, the mobile telecommunication device, or both devices generate a trigger signal will depend on the specifics of the charging device and of the mobile telecommunication device. Configuring both the charging device and the mobile telecommunication device for generation of the trigger signal may be advantageous as this may lead to the system being adapted to a wide variate of devices for mobile telecommunication.

Upon generation of the trigger signal, whether by the charging device or by the mobile telecommunication device, the mobile telecommunication device may send a further information signal comprising the identifying information received from the localisation unit to a central registration system. This may be achieved in several ways. In an embodiment, the mobile telecommunication device may be configured to only send the signal if the trigger signal has been generated. Alternately or additionally, the charging device may only enable/power the localisation unit (and hence the broadcasting of the signal) once the trigger signal is generated.

Because wirelessly charging the mobile telecommunication device is only possible when the device is placed in close proximity of the charging device (i.e. when a coupling may occur between the charging device and the mobile telecommunication device) and the charging device is arranged at the location of a specific physical space, one can be sure that the mobile telecommunication device is in close proximity of the physical space. Assuming that the user of a mobile telecommunication device tends to stay close to the mobile telecommunication device, the charging of the mobile telecommunication device is a fair indicator of the presence of a person in or close to the physical space and therefore of the occupancy of the specific physical space.

Furthermore, tying the determination of occupancy to the coupling of the mobile telecommunication device to a charging device avoids some false positives, which may in other systems for instance occur if someone temporarily stands next to a location.

In a further embodiment the mobile telecommunication device is configured to generate a mobile telecommunication device identification signal comprising identifying information of the mobile telecommunication device, the mobile telecommunication device preferably being configured to send the mobile telecommunication device identification signal to a central registration system.

In order to identify which specific physical space of a plurality of physical spaces is occupied, the location of the specific physical space should be determined as well. This determination of the location of the physical space is accomplished by the localisation unit. The localisation unit may broadcast an information signal (for instance, a permanent signal independent on the status of the charging device or, preferably, a signal triggered by the activation of the charging device due to the presence of a mobile telecommunication device) to the mobile telecommunication device. Based on this information signal the location of the physical space may be determined. This can be done in various ways, as will be explained hereafter.

The identifying information comprised in the signal broadcast by the localisation unit may comprise a unique identifying code, preferably a universally unique identifying information code, uniquely identifying a localisation unit from among a set of localisation units. This identification can be used by the controller to determine the geographical location of the localisation unit. In order to determine this location, the database stored on the central registration system may comprise the identifying information of a plurality of localisation units as well as further information about the localisation units. The further information may comprise geographic location information about the localisation unit.

The database of the central registration system may further comprise identifying information of a plurality of mobile telecommunication devices as well as further information about the mobile telecommunication devices, such as in particular information about a phone number associated with the mobile telecommunication device and/or information about the user of the mobile telecommunication device.

In this manner not only data about the fact that a physical space is occupied and about the geographical position can be determined, it is also possible to couple this data to information representative of the identity of the mobile telecommunication device or even the identity of its user. The central registration system may hence determine both the location and the identity of the mobile telecommunication device placed in the physical space, i.e. it may become possible to determine which persons occupy which physical spaces in the course of time. Generally this coupling is only possible if the identity of a user or owner of the mobile telecommunication device is known a priori, for instance prestored on the central registration system. However, it may also be possible to gradually populate the database, or to add to a pre-populated database: for instance, if identifying information of an unknown mobile telecommunication device is received, the central registration system may be configured to instruct the mobile telecommunication device to prompt the user to input information, for instance a name. The central registration system may also be configured to request the phone number of the mobile telecommunication device, or in other embodiments the phone number itself may serve as the identifying information of the mobile telecommunication device. The skilled person will be aware of many more alternatives.

Likewise, the database may be gradually populated with regards to the geographic information: if identifying information of an unknown localisation unit is received, the central registration system may be configured to instruct the mobile telecommunication device to prompt the user to input information, for instance by indicating the geographic location information on a map.

The controller may be configured to further determine the location of the physical space concerned based on an identification code included in the received broadcast signal and a prestored list of identification codes and associated locations, for instance in the form of geographic information. This list may have been stored on the mobile telecommunication device and/or on the remote device such as the central registration system. Comparison of the received identification code with the identification codes in the list leads to the location (i.e. data representative of the geographical position of the localisation unit).

Close proximity in this application is intended to mean "at a distance sufficient to allow a wireless transfer of electromagnetic power from the charging device to the mobile telecommunication device". This distance may vary, for instance 20 cm or less, 10 cm or less or 5 cm or less. The mobile telecommunication device may be any type of hand-held device capable of one-way or two-way wireless communication, for instance via a wireless local area network or, preferably, via a telephone network. Examples of such hand-held device are smart phones, tablets, etc.

In a further embodiment the central registration system is configured to deduce and store in the database a plurality of associations between mobile telecommunication devices and geographic locations of localisation units, wherein these associations are obtained by combining the identifying information of the localisation unit sent by a mobile telecommunication device, the identifying information of that mobile telecommunication device sent by the mobile telecommunication device, as well as the geographic location information corresponding to said identifying information of the localisation unit retrieved from the database.

In a still further embodiment the central registration system is configured to send out a signal comprising the deduced and stored information about the geographic location of a plurality of mobile telecommunication devices to the plurality of mobile telecommunication devices. The plurality of mobile telecommunication devices are configured to request and receive a signal comprising information about the location of a plurality of mobile telecommunication devices for which the geographic location was deduced and stored from the central registration system, and, preferably, to display this information. The central registration system may be configured to deduce and store information about the availability of a plurality of systems based on the information about the location of the plurality of devices for mobile communication for which the location was deduced and stored. The plurality of mobile telecommunication devices are configured to request and receive a signal comprising the information about the availability of a plurality of systems from the central registration system, and to display this information.

The system may further be configured to remove the association between a certain localisation unit and a certain mobile telecommunication device from the database if no information is received from a mobile telecommunication device during a period of time of a certain pre-set length. Alternately or additionally, if a mobile telecommunication device is listed in the database as associated with a certain localisation unit, and it later is placed on a charging device with a different localisation device, the association may be automatically updated in the database, but the user may also be provided with a prompt asking whether he or she has indeed switched workstations. The user may also be able to access a "check-out" option on the mobile telecommunication device which removes the association. A location may also be provided with an access control system (which may be equipped with a similar or different localisation unit) configured to control the access to and departure from a geographic region wherein a plurality of physical spaces are arranged, wherein if the access control system detects that a mobile telecommunication device (enters or) leaves the geographical region, an access signal is generated and sent to the central registration unit, wherein if an association exists between the mobile telecommunication device and a localisation unit, the central registration unit removes this association from the database upon receiving the access signal. Many variations on these solutions may be envisaged by the skilled person.

In embodiments of the invention the system is configured to provide to its user(s) further location based services (as the location of an individual can be determined in an accurate and reliable manner). In these embodiments, the central registration system and/or a mobile telecommunication device may further comprise a control unit; a plurality of parameters (for instance the temperature, the brightness of the light, etc.) of a workspace equipped with a charging and localisation unit as defined may be configured to be controllable by the control unit; the coupling of a mobile telecommunication device to the charging device may be configured to cause a trigger signal to the control unit; and the control unit may be configured to automatically adjust the plurality of parameters on the basis of pre-set preferences associated with the mobile telecommunication device upon receipt of the trigger signal. For instance, the central registration system may be configured to deliver location based services depending on the determined geographical location of the mobile telecommunication device, for instance heating or cooling the room in which the physical area is arranged unit a preferred temperature set by the user of the mobile telecommunication device has been reached.

As mentioned above, the controller is configured to determine the location of an occupied physical space based on the broadcast signal of the localisation unit. However, a problem may arise if a certain mobile telecommunication device receives several signals broadcast by a number of different localisation units. In an embodiment, which signal corresponds to the localisation unit the mobile telecommunication should be associated with is assessed by comparing the signal strengths. The signal with the largest signal strength is taken to be the signal of the appropriate localisation unit. In a further embodiment, this determination may be verified by based on which broadcast signal is broadcast by the localisation unit which most recently started broadcasting. This may indicate which localisation unit is connected to the charging device which most recently coupled to a mobile telecommunication device. This should be the localisation unit on which a mobile telecommunication device was placed most recently. Combining the two methods may lead to a good determination of which signal to use in the presence of more than one signal from a localisation unit. A determination just on the basis of which localisation unit is connected to the charging device which most recently coupled to a mobile telecommunication is of course also possible. If only one broadcast signal is received, the localisation unit associated with this broadcast signal is considered to represent the location of the physical space concerned.

The controller may be the control unit comprised in the mobile telecommunication device. In a specific embodiment the controller may be formed by a computer program (app) running on the processor of the mobile telecommunication device. In other embodiments the controller may be the control unit of a remote computer device, for instance a central registration system or similar device. The mobile telecommunication device and the remote computer device may be arranged to communicate with each other.

In further embodiments the controller may be formed by a plurality of control units, for instance a first control unit in the mobile communication device and a second control unit in the remote computer, for instance in the central registration system.

The charging device for charging the battery of the mobile telecommunication device is powered through a connection with an electrical power network, for instance a mains supply. Similarly, the localisation unit may be powered by this electrical power network, either directly or through the charging device. The latter option is preferred, both for reasons of convenience and because it allows the charging device to enable and disable the localisation unit. The system may comprise a power source configured to provide both the charging device and the localisation unit with power.

The localisation unit may be configured to broadcast the information signal in a wireless manner to the mobile telecommunication device. The localisation unit is preferably configured for short-distance wireless communication. For instance, the localisation unit may comprise a beacon, such as a Bluetooth beacon or, more specifically, an iBeacon or similar device. Other protocols, either existent or yet to be developed, may of course also be suitable to be used in the invention.

In an embodiment of the invention both the charging device and the localisation unit are housed in one common housing. The housing may be compact (for instance having dimensions in the order of several centimetres). In certain embodiments the housing has an essentially cylindrical shape which can be easily concealed in pieces of furniture (for instance in a desk) or in the construction elements of a building. In a further embodiment the housing comprises at least a fastening element configured to fasten the housing at or in the physical space, wherein the fastening element is preferably configured to fasten the housing to a workspace in the physical space, for instance in the table top of a desk. The fastening element may be configured such that the housing may be fastened in a removable manner.

The charging device may comprise a power transmitter unit (PTU) for wireless power transmittal to a mobile communication device paced in close proximity, which generally means that it comprises a plurality of coils. The mobile telecommunication device may comprise a power receiver unit (PRU) receiver for wireless power receipt. The charging power is typically 5 W or less and/or the close proximity is typically 5 cm or less. The charging device may be a device that has been made compliant with the Qi standard or the AirFuel (A4WP) standard.

The mobile telecommunication device may be any device configured to be wirelessly charged by a charging device, to wirelessly receive from a localisation unit the information signal comprising identifying information of the localisation unit and to send a further information signal comprising information representative of the identifying information received from the localisation unit wirelessly to a central registration system. The central registration system may be any system configured to receive signals from a mobile telecommunication device and to send signals to a mobile telecommunication device, the central registration system preferably being configured to receive the further information signals from respective mobile telecommunication devices and to determine the locations of the physical spaces that are occupied or unoccupied. Furthermore, the central registration system may be configured to determine and send an occupancy signal to a mobile telecommunication device, the occupancy signal being indicative of which physical spaces are currently occupied or unoccupied. In this way the user of the telecommunication device may be notified where he or she can find an unoccupied physical space, for instance an unoccupied work space. This notification can be accomplished, for instance, by displaying the unoccupied (free) physical spaces on a map on the display of the telecommunication device.

According to another aspect a method is provided of determining the occupancy of one or more physical spaces, each physical space provided with a charging device and localisation unit, the method comprising:

wirelessly transfer power from a charging device to a mobile telecommunication device when the mobile telecommunication device is placed in close proximity to the charging device;

broadcast an information signal comprising identifying information of the localisation unit to the mobile telecommunication device;

upon detection of the charging of the mobile telecommunication device determining that the associated physical space is occupied;

determine the location of the occupied physical space based on the broadcast signal from the localisation unit.

According to a further aspect, the method may comprise only broadcasting the information signal to the mobile telecommunication device if a mobile telecommunication device is coupled to the charging device with which the localisation unit is associated.

According to a further aspect, the method may comprise determining which of a plurality of signals broadcast by localisation units received by a mobile telecommunication device is a signal corresponding to a charging device in close proximity to the mobile telecommunication device; wherein the determination is made on the basis of signal strength and/or on the basis of which broadcast signal is broadcast by the localisation unit which most recently started broadcasting.

According to a further aspect, the method may comprise determining which mobile telecommunication device is located at the occupied physical space based on identifying information of the mobile telecommunication device.

According to a further aspect, the method may comprise sending information about the occupancy of physical spaces to mobile telecommunication devices which request this information.

According to a further aspect, the method may comprise determining that a physical space is no longer occupied based on the absence during a pre-set time of a signal from a mobile telecommunication device which was occupying the physical space.

Further advantages, features and details of the present invention will be elucidated on the basis of the following description of several embodiments thereof. Reference is made in the description to the accompanying figures, in which:

FIG. 3 is a block diagram of an embodiment of the invention;

FIG. 4 is a flowchart of an embodiment of the method according to the invention;

Figure 5A:
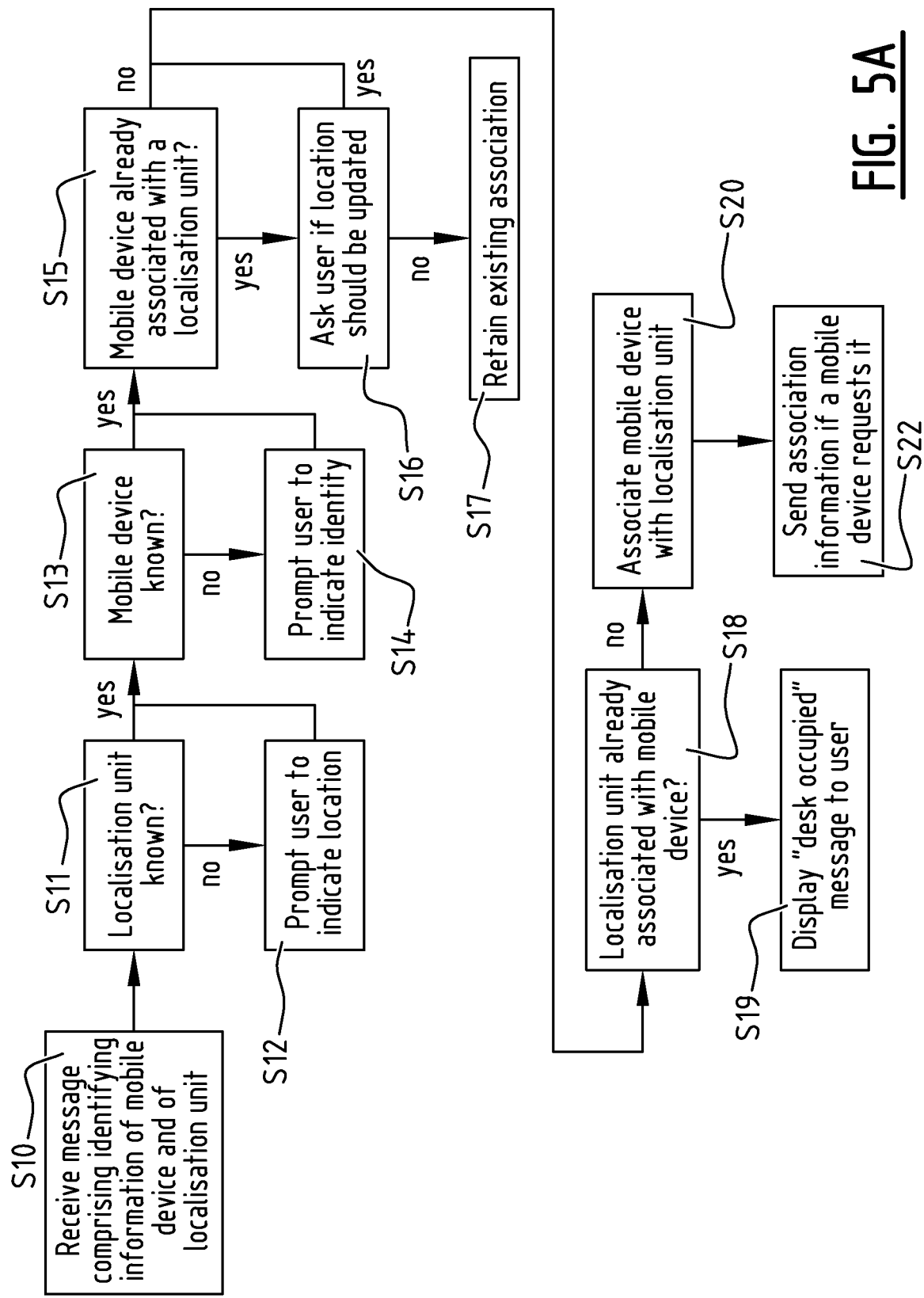
Figure 6:
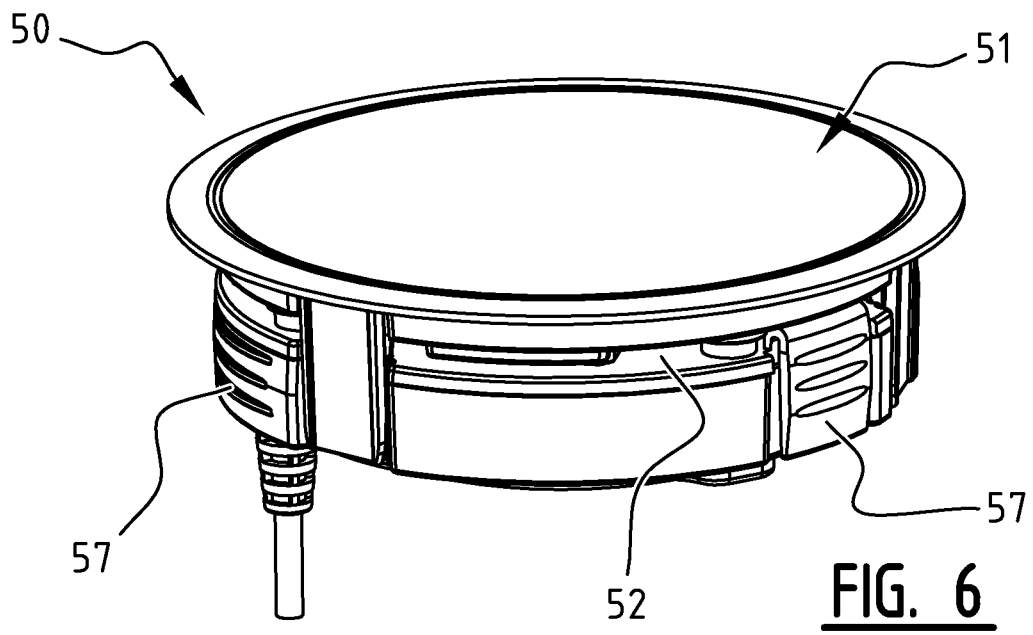
Figure 7:
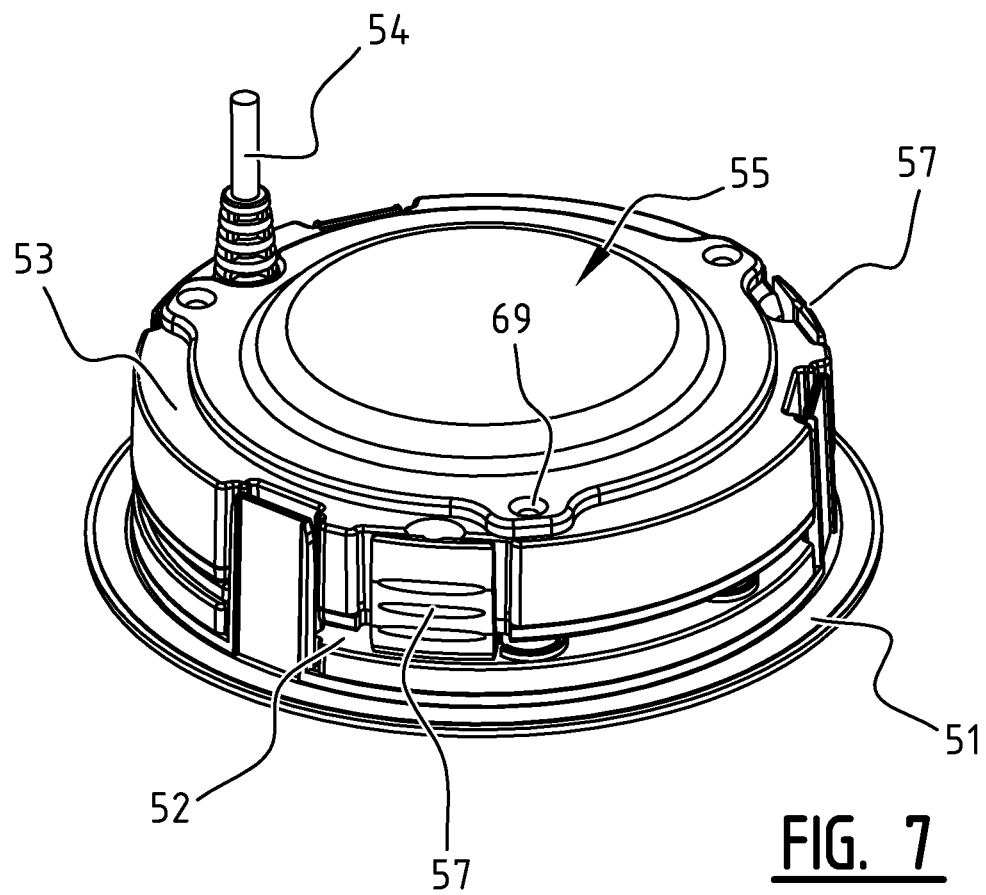
Figure 8:
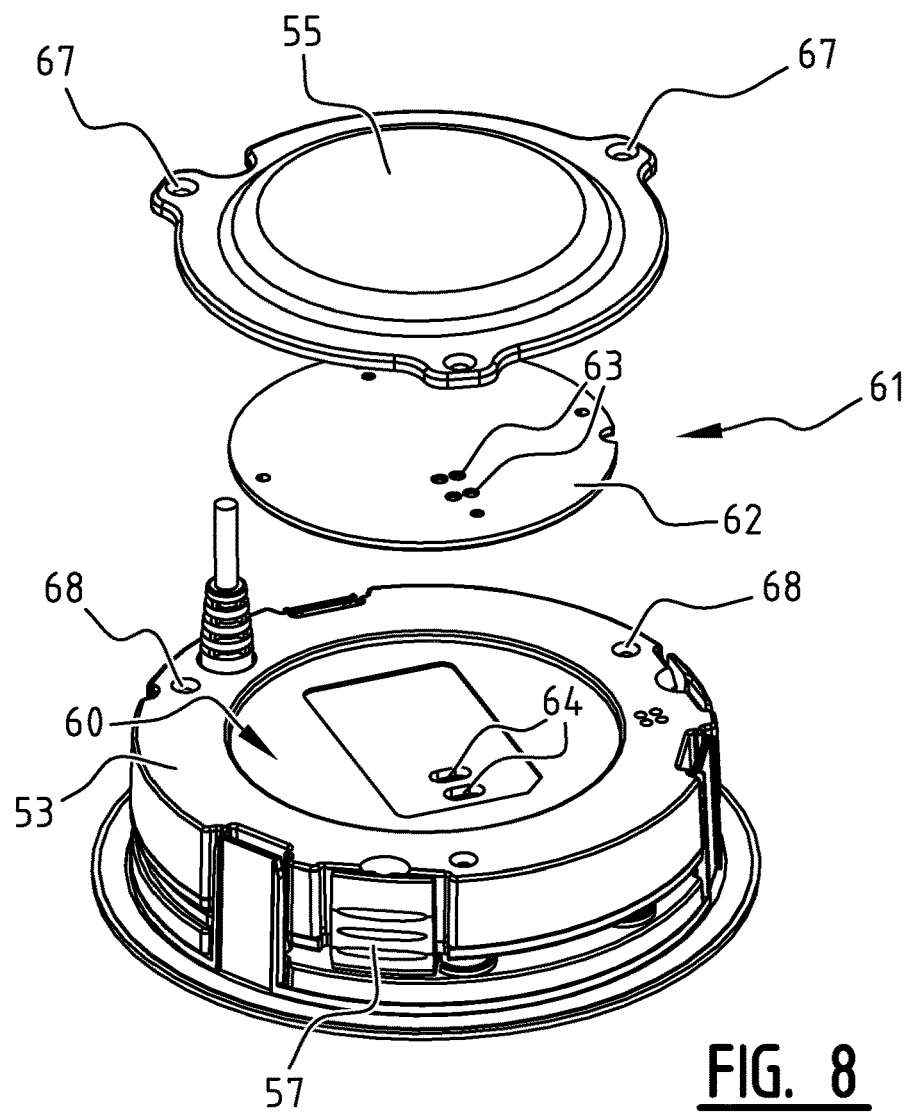
Figure 9:
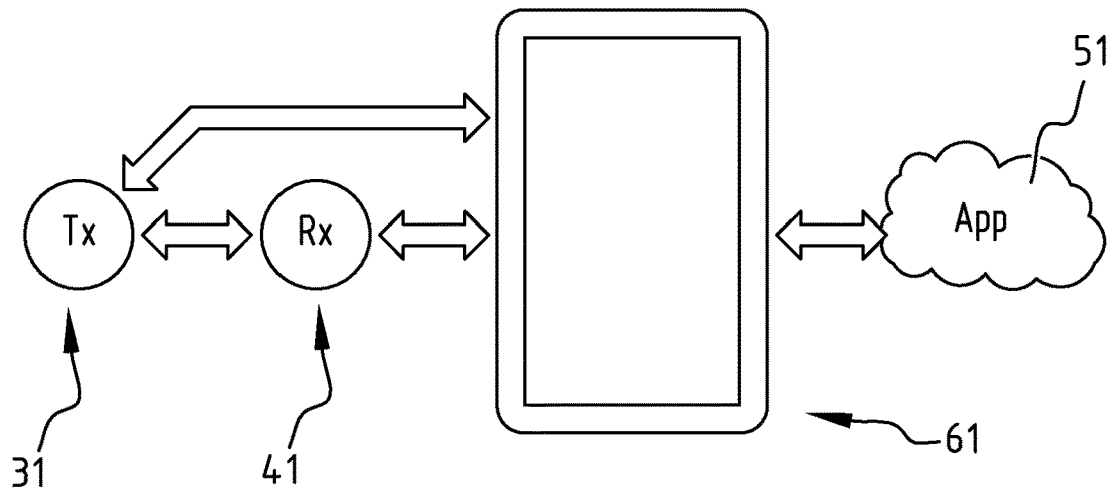

FIG. 5A/5B/5C are flowcharts further explaining an embodiment of the method;

FIG. 6 is a top view of an embodiment;

FIG. 7 is a bottom view of the embodiment seen in FIG. 6;

FIG. 8 is an exploded view of the embodiment of FIGS. 6 and 7;

FIG. 9 is a more general sketch of an embodiment of the invention.

The figures will now be described in more detail. In the figures, like elements will be referred to by like reference numbers.

Please let it be noted that while the figures are mostly aimed at an embodiment for localisation of employees, the system can be applied in a large number of different contexts in which measuring occupancy and/or location is a factor. One possibility, for instance, would be use in restaurants, wherein orders could be input on the mobile telecommunication device of a customer, and linked to his or her location. Another possibility is to determine the crowdedness in trains, wherein a central application may then ensure that new travellers are directed to least crowded compartments of a train. Yet another possibility is in hotels, wherein the system may be used to ascertain whether a customer is currently in his or her room or not.

Other applications that might benefit from this concept are for example: delivering orders in a (self-service) restaurant or several restaurants e.g. in an amusement park/airport/festivals, free parking spaces in a parking garage where cars are inductively charged (as well as help remembering where your car was parked), finding your colleague/friend in the hall of a convention centre or in another crowded location, etc. These are all examples where WPT can be applied in combination with a communication system. Any situation in which it is useful to unequivocally determine whether a specific location is free or not, and in particular situations where it may be useful to precisely locate a person or device, may benefit from a system according to the invention.

Furthermore, while some of the described embodiments relate to devices that charge mobile telephone devices, the teachings of the invention may be applied beyond that. For instance, electric cars, while still rare, are gradually conquering more and more of the market, and an embodiment combining inductive charging of an electric car including a mobile telecommunication device with a system according to the invention could be very useful in mapping the occupancy of potentially scarce charging spots.

In what follows, for the sake of legibility "mobile telecommunication device" or "mobile telecommunication device" has regularly been substituted with the words "smart phone", as this will in many contexts be the most used mobile telecommunication device, but it will be clear to the skilled person that any device that is configured to be charged wirelessly and is adapted for mobile telecommunication (which device may include a vehicle such as a car, airplane and the like, provided with the possibility of mobile telephone communication) is covered by this term. Likewise, the disclosure will tend to refer to "desks" and "workspaces", but these are of course just one of many possible options for which this invention may be used. Finally, the word "central" in "central database" is not meant to be limiting: there may be several central databases (for instance at least one per company using the system), and the database need not be centrally located.

Figure 1:
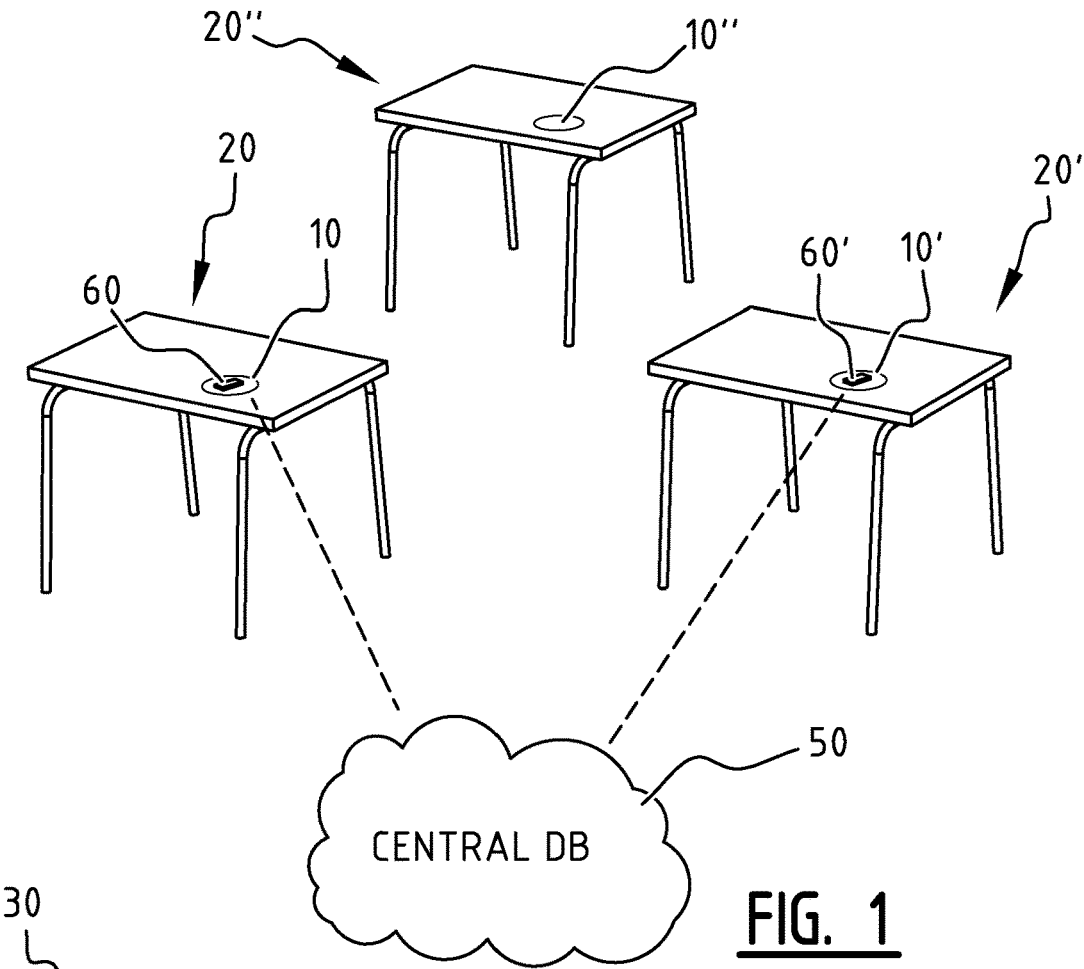
FIG. 1 is a simplified sketch of an embodiment according to the invention.

In FIG. 1, an embodiment is depicted in which a plurality of systems 10, 10', 10" is installed in a number of desks 20, 20', 20". The systems are depicted for the sake of clarity as a simple circle to reflect one possible embodiment wherein the shape of the housing of the system is generally cylindrical. However, the system can take many different shapes and the present disclosure is not restricted to the one specific cylindrical shape depicted. In many cases the systems will be placed in a recess in the table in such a manner that the surface of the table will remain substantially planar. However, the systems need not be an integral part of the workspaces: they may also be connected in a more easily removable manner, or even be embodied as disconnected devices. In many cases, however, it is preferable for the systems to be visible from the top of the desk only as an indication on the desk to allow a user to properly position a smart phone for charging.

While in the figure all desks 20, 20', 20" are depicted as being in a single location or at least close to one another, the invention lends itself in particular to situations in which there are many desks which are not all in direct view of each other, and which may even be spread out over several floors, buildings, or even cities and countries. While cables are not depicted in FIG. 1, the systems 10, 10', 10" according to the invention will be provided with power, for instance mains electric power. While battery power is not excluded, this will in most cases be achieved through a connection with the local electricity network.

In FIG. 1, three desks 20, 20', 20" are depicted. Each desk is a possible work station. A first employee may choose one of these workstations 20 and start working at this work station. At this point, to signal his presence and in order to charge his smart phone 60 (or other mobile telecommunication device) he may place the smart phone 60 on an indicated spot on the desk, beneath which the system 10 is installed. A second user may choose a second workstation 20' and position his or her smart phone 60' on the associated system 10'.

Figure 2:
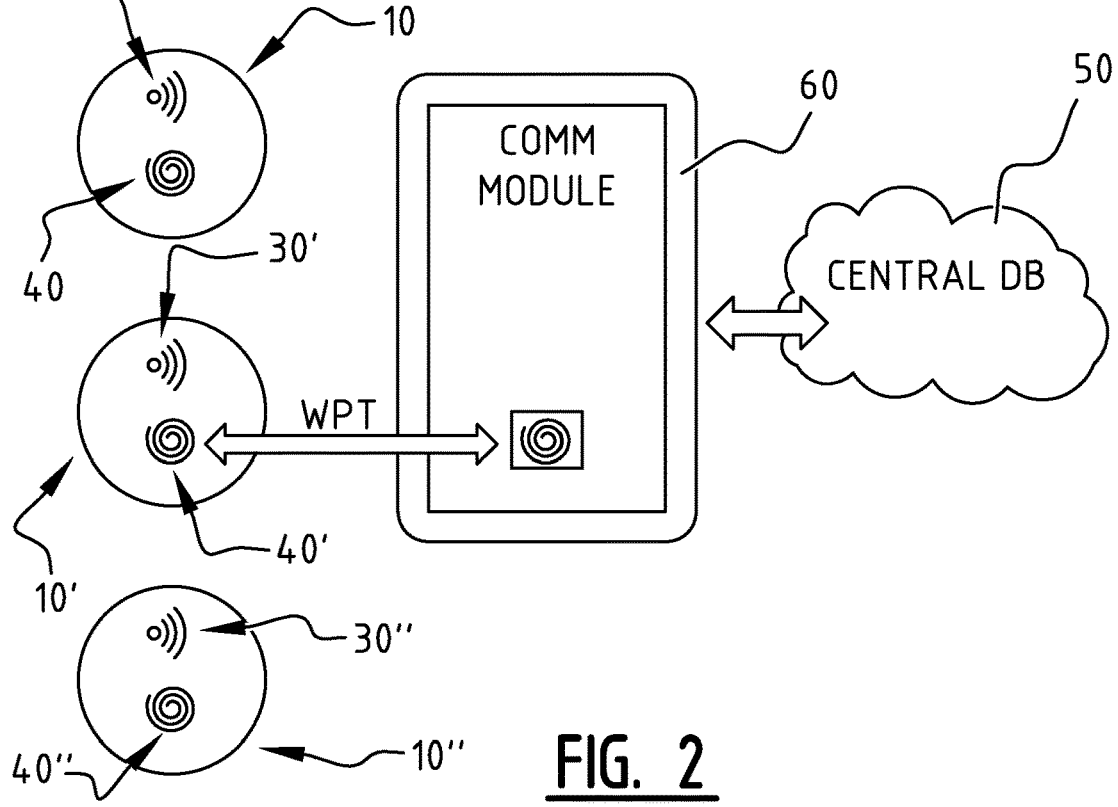
FIG. 2 is a sketch of an embodiment of the invention.

FIG. 2 is a schematic top-view of three systems 10, 10', 10" as well as a smart phone 60. Please note that in actuality, the smart phone 60 would be positioned on top of the system 10', such that the coil or coils of the power transmitter unit (PTU) are substantially aligned with the coil or coils of the power receiver unit (PRU); the two have been depicted next to each other for the sake of clarity. FIG. 2 shows three systems 10, 10', 10", each comprising a charging device 40, 40', 40" and a localisation unit 30, 30', 30". A mobile telecommunication device 60 is positioned within close proximity of one of the systems 10', i.e. within several centimetres.

Once a smart phone 60' is properly positioned on a desk 20' for charging, wireless power transfer will take place from the charging device 40', which is part of the system 10', to the smart phone 60' for as long as the smart phone 60' is located in the proper position and as long as is necessary (i.e. until the device is fully charged, or until the charge of the device exceeds a certain pre-set battery percentage).

Wireless Power Transfer (WPT) is a known technique that is increasingly common in the market. In most systems for WPT, both a charger and a device to be charged are equipped with coils (depicted in an abstract manner in FIG. 2) which may be inductively coupled if the two coils are place in close proximity to one another: a current in the coil in the charger produces a magnetic field, and a current is produced in the coil in the device to be charged as a result of this magnetic field.

In the above and in what follows, "a coil" and "the coil" will generally be referred to in the singular. As the skilled person is aware, however, a plurality of coils may also be used, and this may in fact in many cases be very advantageous. Therefore, in this disclosure, "a coil" and "the coil" may be read as "at least one coil" and "the at least one coil" respectively.

The techniques to apply this principle to the charging of mobile telecommunication devices such as smart phones is known, and an increasing number of smart phones and other devices is now configured to be able to be charged wirelessly. Standardisations (e.g. Qi, AirFuel(A4WP)) have been developed, and the skilled person will know how to construct a WPT system and protocol suitable for a certain type of device to be charged. The technique will therefore not be described in more detail herein.

A localisation unit 30, 30', 30", specifically a beacon, is depicted in the abstract drawing in FIG. 2 as part of the same entity as the charging device 40, 40', 40". The localisation unit/beacon 30, 30', 30" may however be embodied as a module that may be attached to an existing charging device. This has as an advantage that an administrator may determine which of the charging locations 20, 20', 20" will be equipped with a localisation unit 30, 30', 30". It has as an added advantage that the localisation unit 30, 30', 30" may be replaced, for instance if it becomes defective or if a better beacon becomes available. The localisation unit 30, 30', 30" may however also be integrated with the charging device 40, 40', 40", such that the charging and localisation unit 10, 10', 10" is a single apparatus. This may also have advantages, such as increased sturdiness.

The localisation unit 30, 30', 30" and charging device 40, 40', 40" are generally both powered by the same source. This power source may be integrated into the charging device 40,

40', 40". While battery-operated beacons exist, powering the localisation unit through the electricity network has as an advantage that there is no need to conserve power, e.g. by broadcasting a signal only infrequently. Furthermore, there is no risk of a beacon not working because the battery has run out. Advantageously, the localisation unit is powered via the charging device: i.e. the charging device is provided with power from the electricity network, and the localisation unit is provided with power by the charging unit. This allows the charging unit to control whether the localisation unit is powered. In other systems, the charging unit may be able to control the localisation unit in different ways: it may for instance be able to instruct the localisation unit to broadcast or not without affecting the power supply.

The functioning of an embodiment of the invention is illustrated in more detail in the diagram of FIG. 3, which is a block diagram of two systems 10, 10'. While the charging devices 40, 40' and the localisation units 30, 30' are depicted as separate blocks, they may be embodied as a single device. They may also be embodied as two connectable modules. Likewise, the power source 70, 70' is depicted as a separate block, but this will in most cases be an integral part of either the charging device 30, 30' or of the combined systems 10, 10'.

While the charging and localisation units 30, 30', 40, 40' may be embodied as integral systems 10, 10', they separately interact with the device for mobile communication 60, 60', and in fact interact with different elements of the device for mobile communication (labelled smart phone here merely for the same of legibility and convenience). The charging device 40, 40' interacts with a chargeable element of the mobile telecommunication device 60, 60', which comprises at least one coil. The localisation unit 30, 30' meanwhile broadcasts a signal comprising a (preferably universally) unique identifier which is received by a receptor of the mobile telecommunication device 60, 60'. This receptor may for instance be a Bluetooth module if the localisation device is a Bluetooth beacon.

The mobile telecommunication device further comprises a communication module capable of communicating wirelessly with a central database. Due to the wide variety of devices for mobile telecommunication currently on the market, and the fact that communication between such a device and a central registration unit is well within the skill set of the skilled person, no further details of the communication module will be given in this disclosure.

The localisation unit 30, 30', 30" broadcasts a signal comprising information, generally a unique identifier, preferably a universally unique identifier. The signal may be broadcast continuously or periodically. If the broadcasting is periodic, it is preferable to configure the localisation unit 30, 30', 30" such that the signal is broadcast at a reasonably high frequency (for instance at least once per second) so that the system may be responsive, and such that a user need not wait too long for his device for mobile communication 60, 60' to receive the signal if it is within range of the localisation unit 30, 30', 30".

The localisation unit 30, 30', 30" may advantageously be embodied as a Bluetooth beacon, specifically a Bluetooth beacon using for instance the Apple iBeacon protocol or another suitable protocol. These beacons are generally equipped for one-way communication, i.e. just the broadcasting of the signal comprising the (preferably universally) unique identifier. However, often a possibility is built in for communication to the beacon in certain situations: for example, the beacon may be in a receiving state for a certain time period after powering up so that it may be configured/updated.

The localisation unit 30, 30', 30" is preferably a beacon with a short range. This may prevent mobile telecommunication devices 60, 60' which are somewhat further away from the beacon (e.g. in the pocket of a co-worker standing next to the desk) from receiving the signal broadcast by the localisation unit 30, 30', 30", thus provided a further prevention measure against "false positives".

A smart phone or other mobile telecommunication device 60, 60' positioned on the indicated spot on the desk beneath which the system 10, 10', 10" is installed will be charged wirelessly by the charging device 40, 40', 40" and will be within range of the signal broadcast by the localisation unit 30, 30', 30". The (preferably universally) unique identifier of the localisation unit 30, 30', 30" may then be checked against a central database 50 in which the unique identifiers of the localisation units are listed together with further information about the localisation units, for instance location information of the localisation units. Other information about the location may also be listed in this database: for instance if the workspace has been reserved for later in the day, or information about the details of the work station.

Populating the database with the information may occur in different ways. The database may be pre-programmed, but it is also an option to gradually add information to the database. For instance, it could be that a mobile telecommunication device 60, 60' is placed on a system 10, 10', 10", receives the identifying information from the localisation unit 30, 30', 30" and sends this on, but no addition information about the location is available. A prompt may then be displayed on the mobile telecommunication device 60, 60' prompting a user to input information about his or her present location, for instance by indicating the location on a map.

The central database 50 may be a part of a central processing unit; however, "central" need not be interpreted literally. The database 50 and an application for managing the database will in many cases be "in the cloud", and may be referred to in what follows as an "App". Use may also be made of a plurality of Apps and/or databases. The skilled person will be familiar with many ways of managing data sent from different smart phones or other mobile telecommunication devices.

The smart phones or other mobile telecommunication device 60, 60' may send the (preferably universally) unique identifier of the localisation unit 30, 30', 30" to a central database 50 together with identifying information of the smart phone or other mobile telecommunication device 60, 60'. Information about the user of the smart phone or other mobile telecommunication device 60, 60' may also be sent, or may also be associated with the identifying information of the smart phone in the central database 50. In the central database 50, it may be recorded which smart phone or other mobile telecommunication device 60, 60' is currently being charged at which location 20, 20', 20", and this information may also be interpreted as information about which user is presently occupying a certain workspace 20, 20', 20". Information about which mobile telecommunication devices correspond to which user may be input into the central database 50 beforehand, but the database may also be gradually populated with data, for instance by prompting users of unknown mobile telecommunication devices to input information on the mobile telecommunication device. Additional information about users may also be stored in the database—for instance their phone number, official title, team name, etc.

Please note that unlike in other systems, the localisation units 30, 30', 30" do not communicate directly with a central database 50. The communication of identifying information of the localisation unit 30, 30', 30" to the mobile telecommunication device 60, 60' is one way communication, and the assessment of which device 60, 60' is being charged at which location 20, 20', 20" is determined due to the mobile telecommunication device 60, 60' communicating this information to the central database 50. Preferably, the communication between the mobile telecommunication device 60, 60' and the central database 50 is two-way communication: information about which user is presently working at which work station 20, 20', 20" may be sent to the various mobile telecommunication devices 60, 60', which may include mobile telecommunication devices not presently being charged at any of the systems 10, 10', 10". In that manner, users may obtain information about where to find a certain co-worker. Also, a user not presently occupying a workstation 20, 20', 20" but in possession of a mobile telecommunication device 60, 60' configured for communication with the central database 50 may determine which work stations 20, 20', 20" are presently unoccupied. More general occupation data, such as the number of unoccupied workstations on certain floors or in certain buildings, may also be provided.

Furthermore, a possibility may also be provided to reserve a work station 20, 20', 20" in advance. When a work station is reserved, a user placing his smart phone or other mobile telecommunication device 60, 60' on the spot corresponding to the system 10, 10', 10" associated with that work station 20, 20', 20" may, upon receiving the unique identifier of the localisation unit 30, 30', 30" and sending this to the central database 50, receive a message informing him or her that the work station 20, 20', 20" has already been reserved by a co-worker.

Please note that while all systems 10, 10', 10" (provided they are properly powered) which comprise a localisation unit 30, 30', 30" may periodically or continuously broadcast a signal, if no device for mobile communication 60, 60' is present within range, the signal will not be received. It may however be advantageous for several reasons—the prevention of false positives among them—to broadcast the signal only if a mobile telecommunication device is within range. This may for instance be achieved by a trigger signal which is generated if a mobile telecommunication device 60, 60' is coupled to a charging device 40, 40', 40", and which may lead to the localisation unit 30, 30', 30" being switched on or switched off. There is no direct communication between the localisation units 30, 30', 30" and the central database 50.

If a smart phone or other device for mobile communication 60, 60' is taken by a user from a system 10, 10', 10", the device may detect that it no longer receives the signal broadcast by the localisation unit 30, 30', 30", and send information to the central database 50 to indicate that the associated system 10, 10', 10" and the corresponding workspace 20, 20', 20" are now available. This may however lead to "false negatives" if a user is simply answering a call to the mobile telecommunication device, and it may be preferable to use a timer system, wherein if the central database 50 does not receive a signal comprising identifying information of a localisation unit 30, 30', 30" from the mobile telecommunication device 60, 60' during a certain pre-set period of time (e.g. 30 minutes or longer), the central database may be updated to indicate that the associated system 10, 10', 10" and the corresponding workspace 20, 20', 20" are now available.

A system such as the system described in the claims may also be used to make workspaces "smarter". For instance, certain aspects of a workplace—such as the desk height, monitor position, lighting settings, temperature settings etc.—may be configured to be controllable by the central registration system and/or the mobile telecommunication device, and preferred settings for a particular user may be implemented as soon as it is detected that this user is presently occupying a certain workspace. The skilled person will be capable of implementing such a system and of imagining various variations and expansions on this idea.

It will be clear to the skilled person how a set-up of this kind can translate to different situations. For instance, in a restaurant or bar context, users may charge their smart phone on a table and also use their smart phone to place orders: due to the fact that the order is associated with the (preferably universally) unique identifier of the localisation unit of the system which is charging the smart phone, it will be possible to know which orders belong at which table, while simultaneously providing a charging service to the customer.

This scenario may for instance take place. A customer decides to order something. He or she may then assemble the order—for instance on a dedicated app—before entering the restaurant, bar, etc. A localisation unit may be present at entrances and exits of the restaurant, bar, etc., such that when the customer enters the order is sent to the kitchen. When the customer sits down, he or she may place his or her mobile telecommunication device, on a charging device according to the invention placed in one of the tabled. This allows the order to be linked to a specific location, such that it may be delivered to the correct customer. Note that this requires the order to be tied both to a specific customer—via his or her mobile telecommunication device—and to a very narrowly specified geographic location—via the system according to the invention.

It will furthermore be clear to the skilled person how the described set-up may be translated to other situations wherein a combination of charging and localisation is desired, such as trains, conference centres, hotels, etc.

As described before, the systems 10, 10', 10" comprise a localisation unit 30, 30', 30", generally a beacon, which is periodically broadcasting a signal comprising a (preferably universally) unique identifier over a preferably short distance. The systems 10, 10', 10" also comprise a charging device 40, 40', 40" comprising at least one coil. An electric current (generally an alternating current) flows through the coil and generates an oscillating magnetic field. In most cases, the magnetic field will be generated whenever the system 10, 10', 10" is powered, though power will only be transferred if another coil is placed in close proximity of the charging device 40, 40', 40", but alternatives (for instance devices in which the current in switched on only after the presence of an object on top of the system has been detected) are within the purview of the skilled person.

When another coil is placed within the generated magnetic field, an electromotive force will be produced (induction), which in turn leads to (an alternating) current in the coil, and a device may thus be charged. This process is often referred to as inductive coupling between two coils. It has been shown that it is especially advantageous to use resonant inductive coupling, wherein two resonant circuits are employed. Other methods for wireless power transfer are however not excluded and fall within the scope of the present application.

Wireless Power Transfer tends to work over rather short distances. A good rule of thumb tends to be that the range is of the same order of magnitude as a tenth of the diameter of the used coils, though it may be expanded beyond that. In general, WPT-units are configured with at least one flat surface, wherein if a mobile telecommunication device lies on the flat surface it is in close enough range to be charged.

The localisation unit 30, 30', 30", usually a beacon, is configured to broadcast over a comparable range to the range for WPT of the charging device. Thus, the mobile telecommunication device 60, 60' will only be able to receive the signal broadcast by the localisation unit 30, 30', 30" when it is positioned within range of the charging device 40, 40', 40".

FIG. 4 is a workflow of an embodiment of the method for charging and localising a mobile telecommunication device as described in the claims. Prior to step S1, a user positions a suitable mobile telecommunication device on a system according to one the embodiments described herein. In step S1, it is detected whether or not a mobile telecommunication device—e.g. a smart phone—is being charged by a certain charging device. If a mobile telecommunication device is coupled to a charging device, either or both of them may generate a trigger signal, and as a result of this trigger signal the mobile telecommunication device will receive a signal containing identifying information of a localisation unit. If the mobile telecommunication device receives signals from more than one localisation unit, a determination will be made of which of these signal is the one associated with the charging device: this is preferably done by taken the signal with the largest signal strength, with an optional verification step based on which localisation unit most recently started broadcasting. A message will then be sent by the mobile telecommunication device comprising identifying information of a localisation unit is received by the central registration unit. The position of smart phone is determined in step S2 from the message sent by the phone: this comprises both identifying information of the phone and identifying information of the localisation unit, which is received from the beacon. Once the position is established, it is "locked" in S3, i.e. the central registration unit will set in a database that this phone is currently located at this position—more details of a manner of achieving this can be found in FIG. 5A. Furthermore, the location will be marked as "in use". An application ("App") is updated with this information in step S4. This App may for instance visually display the location, which may be done in many different ways—an avatar on a map depicted a certain arrangement of workstations, for example.

Step S5 occurs once the phone is removed from its position, i.e. is no longer in close proximity to the system. This may be detected in various ways: it may for instance be detected from a lack of signal from the phone during a certain pre-set time period, or because the phone has been configured to send a message once it no longer received a signal from a localisation unit. It is preferable, however, for the location to not be immediately "released", as this would mean that the workstation would no longer be marked as "in use" as soon as the user picks up his or her phone to answer a phone call. It is therefore advantageous to only "release" the workstation after a certain amount of time (for instance 15 minutes) has passed. Once this period has lapsed, the workstation will be "released" (step S7) and the App will be updated, for instance to mark the workstation as free and/or to make clear that the location of the user is presently unknown (until, of course, his or her phone is placed on another system).

Alternatives to the depicted workflow are of course possible and available to the skilled person. For instance, in addition to or instead of the "time-out" function to release a desk, a "check-out" function could also be employed. This may for instance be embodied as an access control system, which for instance releases a location previously marked as "in use" by a certain mobile telecommunication if/when it detects that the mobile telecommunication device leaves a geographic region. A simple way of embodying such an access control system is a beacon located close to entrances/exits of a geographic location, such that a user entering or leaving a building may be registered, but many alternatives will be available to the skilled person.

Figure 5B:
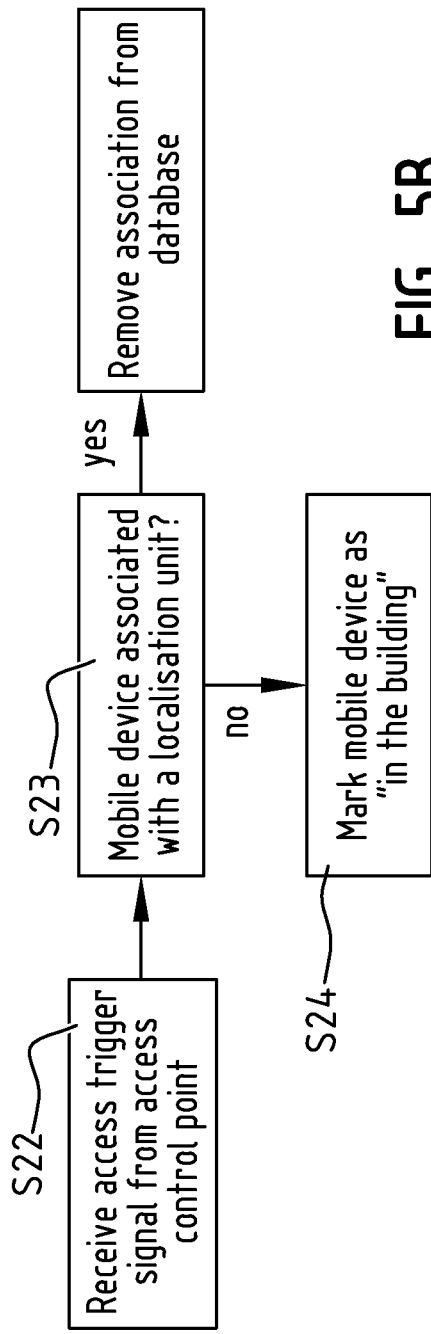

FIG. 5 is collection of three flowcharts 5A, 5B, and 5C which depict the method according to the invention from the perspective of the central registration system. In step S10, this system receives a message sent by a mobile telecommunication device, which comprises both information about the localisation unit (which the mobile telecommunication device received from the localisation unit) and information about the mobile telecommunication device itself, and potentially information about its user.

In step S11 and S13, the central registration system assesses whether the localisation unit and the mobile telecommunication device are already registered in its database. In the flow chart, S11 is depicted as preceding step S13, but this need not be the case, and in general the skilled person will be aware that all the steps in flowchart 5A may be ordered differently.

If the localisation unit is not yet known, which may for instance be the case if the system was just installed, but which may also occur if a workstation is added to a location, the central registration system will instruct the mobile telecommunication device to prompt the user to indicate his or her location in step S12. This may for instance take the form of showing the user a map on which the location may be indicated. Alternately, gps information may be used, which does not necessarily require a prompt to the user. Furthermore, this step may be refined if an access control system is present, as this may indicate in which general geographic area the user is located, which can make clear which map should be presented to the user. The location is stored in the database. To increase accuracy, the prompt may be presented to the first n users of a workstation, and the location may be assumed to be the average of the responses. It may also be advantageous to offer the user an option to modify the location, which makes it possible to move desks around without disrupting the system.

If the mobile telecommunication device is not yet known, the central registration system will instruct the mobile telecommunication device to prompt the user to input identifying information, such as for instance a name (step S14). The central registration system may also request the phone number of the mobile telecommunication device. This information is stored in the database.

The central registration system furthermore checks whether the mobile telecommunication device which has sent the information (and of which the identifying information is comprised in the message) is already associated with a certain localisation unit (step S15). If so, the central registration system will instruct the mobile telecommunication device to prompt the user, asking them whether they want to update their location (S16). If not, the association is retained (S17). If the user replies that they do want to update their location, the system moves to step S18. Please not that while step S15 precedes step S18 in the flowchart, the order may also be reversed. In the reverse order, a yes in step S17 would directly lead to updating the association (S20).

The central registration system furthermore checks whether the localisation unit of which the identifying information is comprised in the message is already associated with a mobile telecommunication device/user (18). If so, the central registration system instructs the mobile telecommunication device to display a message to the user indicating that the workstation has already been claimed by another user. Optionally, an option may be provided for a user to override this. If the workstation is not occupied, the mobile telecommunication device and the localisation unit of which the identifying information was comprised in the message will be associated (S20).

Finally, the new association information may be sent out to a plurality of mobile telecommunication devices, in particular if a mobile telecommunication device requests this information, for instance in an attempt to locate a particular person (S21).

Flowcharts 5B and 5C illustrate to ways an association may be removed from the database. In flowchart 5B, this may begin with step S22, in which a message is received from an access control point, in particular a trigger message, signalling that a specific mobile telecommunication device just passed by the access control point. If the mobile telecommunication device was associated with a localisation unit (step S23), it is assumed that the user of the mobile telecommunication device just exited a geographical area in which localisation units are located, and the association of this mobile telecommunication unit with a localisation unit is removed from the database (S25). An additional feature that may be useful in some situation is one that, if the mobile telecommunication device was not associated with a localisation unit, assumes that the user of the mobile telecommunication device just entered a geographical area in which localisation units are located, and the central registration system may mark this user as "in the building" or something similar (step 24). This may be useful to locate the user even if they have yet to position their mobile telecommunication device on a charging device. It may also be useful to present a suitable map to the user if they place their mobile telecommunication device on a charging device with an unknown localisation unit. However, this option may be omitted in other embodiments.

Figure 5C:
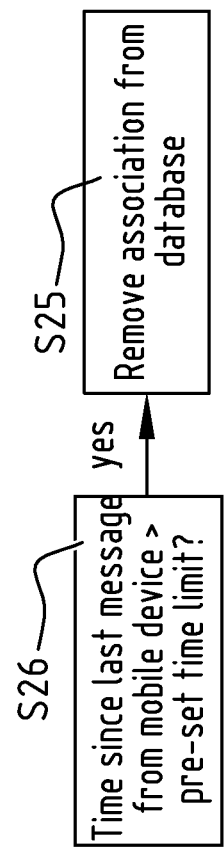

Another manner in which an association may be removed from the database is depicted in FIG. 5C. It is advantageous if an association is not immediately removed if the central registration system stops receiving messages—after all, a user may pick up their mobile telecommunication device to make a call, without leaving the workstation. Therefore, the central registration system may monitor whether the time since the last message from a certain mobile telecommunication device is longer than a pre-set time limit (S26), where this time limit may for instance be 30 minute, 1 hour, 2 hours etc. depending on the type of work and desired flexibility. If the time exceeds this pre-set time limit, the association between the mobile telecommunication device and the localisation unit it was associated with is removed from the database (S25).

The charging device and the localisation unit may be housed in single housing 50. The housing may be made of plastic or any other suitable material and is shaped so as to be arranged in a cylindrical cutaway or cavity of a workplace, for instance provided in a piece of furniture such as a desk. The upper side of the housing may be arranged to be flush with the upper surface of the piece of furniture, However, it is also possible to arrange the housing in a cutaway provided at the bottom side of the piece of furniture. The upper side of the housing in this case of covered by the upper part of the piece of furniture (desk) so that the housing remains invisible at the visible side of the furniture.

The housing 50 comprises a top plate 51, a cylindrical side wall 52 and a bottom plate 53. The top plate, bottom plate and wall form a volume in which the charging device is arranged. The charging device is powered through a a mains cord 54 connected to an internal power supply (not shown). The side wall 52 is provided with fastening elements 57 for fixing the housing inside the cavity or cutaway. In the shown embodiment the fastening elements comprise flanges that are biased radially outward or flanges that can be urged manually in a radially outward direction by arranging a screw into openings 69 (cf. FIG. 7).

The bottom plate 53 of the housing is provided with a recess 60 that provides room for the localisation unit 61. The localisation unit 61 comprises a PCB (not pictured) provided with a number of power terminals extending from the PCB for which apertures 63 have been made in plate 62. The power terminals can be slid through the apertures 63 into corresponding power terminal openings 64 provided in the bottom plate 53 so as to provide galvanic contact between the electrical components on the PCB and the power supply inside the housing. The recess 60 and the localisation unit 61 arranged therein may be shielded from the environment by a cover plate 55. The cover plate 55 and the bottom plate 53 are provided with corresponding openings 67 and 68 so that the cover plate 55 can be easily attached to the bottom plate of the housing.

The top plate 55 is an aesthetic feature, which may for instance be covered in the same material as the desk it is meant to be part of. On this top plate 55 may be an indication that this spot is where mobile telecommunication device should be put to be charged (a plus sign is commonly used, but there are many alternatives). In the depicted embodiment, fastening elements 57, specifically ribbed flanges, may be used to "click" the system into a suitable cavity in a desk.

In the depicted embodiment, the localisation unit 32 is a beacon that may be attached to a charging device. This may be convenient as this allows existing charging devices to be converted into charging and localisation units. However, the localisation unit may also be embodied as an integral part of a system, wherein the charging unit and localisation unit are both arranged within a single housing, which may for instance take the shape of a disc.

Regardless of how precisely the charging and localisation unit is embodies, it is preferably provided with fastening elements 57 which may be used to fasten the charging and localisation unit on or in a physical workspace, preferably in a removable manner. It is preferably to make it easy to remove the charging and localisation unit from the workspace such that it may be repaired or upgraded.

The system also comprises a controller (not depicted), which may for instance be a controller of the mobile telecommunication device. The controller may for instance take the form of an application or App, which may execute on the mobile telecommunication device itself or be run in "the cloud".

The controller receives information about signals received by the mobile telecommunication device, which preferably comprises an identification code. The controller may also receive a signal relating to whether or not the mobile telecommunication device is presently being charged. If the mobile telecommunication device is within range of two localisation units, the signal with the highest signal strength may be taken as representative of the relevant localisation unit, and the corresponding identification code will be used. Furthermore, in systems in which the localisation unit only broadcast if a mobile telecommunication device has been coupled to a charging device, the signal broadcast by the localisation unit which was last to start broadcasting will generally be representative of the correct localisation unit, and this may be used as a further check.

Upon receiving the identification code of a localisation unit, and preferably only if also a signal is received indicating that the mobile telecommunication device is being charged, the identification code of the localisation unit will be checked against a database comprised a pre-stored list of identification codes and associated location information. This location information may for instance comprise geographic information, or information about the workspace, including available amenities. This enables the controller to determine the location (for instance the geographic location) of the mobile telecommunication device when it is being charged by a charging and localisation unit.

In an alternate embodiment to detect whether or not a workstation is occupied, the localization unit could be disabled, e.g. by switching on or off the power supply, as soon as charging of the smartphone is detected. In that case the beacon starts or stops transmitting depending on whether a mobile telecommunication device is being charged, which again can be detected by a mobile telecommunication device. This means that the controller would only receive a signal comprising an identification code if the charging and localization device is in use. In this embodiment, the potential issue of not being able to determine the exact location of the charging and localization device of that particular desk but instead that of the adjacent desk is circumvented. Note that the condition to determine if a workstation is "in use" or not remains the same.

The determined locations of a plurality of mobile telecommunication devices may be made accessible to other mobile telecommunication devices in various ways. For instance, a plurality of controllers may communicate the determined locations to a central database, which may then distribute this information to the plurality of controllers. However, other possibilities, including direct communication between various controllers, will also be clear to the skilled person.

The determined locations may be used in several ways. For instance, the central registration system may determine an occupancy signal, by keeping track of which locations were recently occupied. It may then send this occupancy signal to a mobile telecommunication device, which may then represent a plurality of received occupancy signals, for instance graphically. This enables a user to find an available spot for his or her mobile telecommunication device to be charged.

The given example of flexible workplaces focuses on knowing which workstation is taken and who is sitting where. However, the concept can be extended with other location based services like personalization of that particular workstation and its direct environment. For example, lighting settings, desk settings, temperature setting, etc. can be adjusted to personal needs or preferences automatically. The controller may for instance be able to control certain aspects of the workstation, and adapt the workstation to the user whose mobile telecommunication device is presently being charged by the charging and localisation device registered as being located at this workstation.

Furthermore, while the present invention allows for the localisation of specific people, a subset of the collected data may also be useful to for instance facility managers: they may not need to know the identity of who is occupying which workstation, but may be interested in aggregate data about, for instance, which workstations are used often and which workstations are seldom occupied. This may be achieved for instance by the controller relaying occupancy data to a secondary server or app.

FIG. 9 depicts an alternate embodiment. In some standards for wireless charging, for instance in the AirFuel (A4WP) protocol, communication is possible between the charging device/transmitter and the mobile telecommunication device. In those cases, a separate localisation unit may not be necessary, and the charging device may both wirelessly transmit power to the receiver in the mobile telecommunication device and wirelessly transmit information back and forth with the mobile telecommunication device. Clearly, a system according to the invention may also be implemented in these alternate embodiments.

It is to be understood that this invention is not limited to particular embodiments described, as such may vary. It is also to be understood that the terminology used herein is for the purpose of describing particular embodiments only, and is not intended to be limiting, since the scope of the present invention will be limited only by the appended claims.

The invention claimed is:

1. System for determining the location of one or more occupied or unoccupied physical spaces, the system comprising: one or more charging devices configured to be arranged at the one or more physical spaces, each of the charging devices comprising a charging unit configured for wireless power transfer to a mobile telecommunication device when the mobile telecommunication device is coupled to the charging unit; one or more localisation units associated with each of the charging devices, wherein each of the localisation unit is configured to broadcast an information signal comprising identifying information of the localisation unit to the mobile telecommunication device; a controller configured to determine the location of an occupied physical space upon detection of the coupling between the mobile telecommunication device and the charging device, wherein the location is determined based on the broadcast signal received by the mobile telecommunication device, wherein the charging device is configured to generate a trigger signal when a coupling between the charging device and a mobile telecommunication device is detected and/or when the charging device starts charging the mobile telecommunication device, and wherein the localisation unit is configured to start broadcasting the information signal only if the trigger signal is generated.

2. System according to claim 1, comprising at least one of: a mobile telecommunication device, wherein the controller of the mobile telecommunication device, is configured to start determining the location of an occupied space at the moment the coupling between the mobile telecommunication device and the charging device belonging to that space or the charging of the mobile telecommunication device is detected; or a storage medium on which relationships between identifying information of the localisation units and geographic location information about the geographical locations of the charging devices associated with the localisation units are stored, wherein the controller is configured to determine the location of an occupied physical space based on the stored relationships.

3. System according to claim 1, wherein the controller and/or the storage medium are comprised in the mobile telecommunication device.

4. System according to claim 1, comprising a central registration system including a storage medium on which a database is stored comprising the identifying information of a plurality of localisation units as well as further information about the localisation units, the further information comprising geographic location information relating to the charging device and/or the localisation unit coupled to the charging device.

5. System according to claim 4, wherein the controller and/or the storage medium are provided as part of the central registration system.

6. System according to claim 1, further comprising at least one of: a mobile telecommunication device, wherein the mobile telecommunication device is configured to generate a further trigger signal when a coupling between a charging device and the mobile telecommunication device is detected and/or when the mobile telecommunication device detects the charging device to start charging the mobile telecommunication device; or a mobile telecommunication device, wherein the mobile telecommunication device is configured to detect the further trigger signal and wherein the mobile telecommunication device is further configured to determine only upon detection of the further trigger signal, from one or more received broadcast signals broadcast by one or more localisation units the nearest localisation unit relative to the position of the mobile telecommunication device, wherein at least one of the localisation units is configured to continuously broadcast the information signal.

7. System according to claim 1, comprising a mobile telecommunication device, wherein the mobile telecommunication device is further configured to send a further information signal comprising the identifying information received from the localisation unit to a central registration system only if the trigger signal and/or the further trigger signal has been generated.

8. System according to claim 1, wherein at least one of: the localisation unit is powered by the charging device, and/or wherein the charging device is configured to power the localisation unit only if the trigger signal and/or the further trigger signal has been generated; the mobile telecommunication device is further configured to generate a mobile telecommunication device identification signal comprising identifying information of the mobile telecommunication device, the mobile telecommunication device being configured to send the mobile telecommunication device identification signal to a central registration system; a database stored on the central registration system, further comprises identifying information of a plurality of mobile telecommunication devices as well as further information about the mobile telecommunication devices, including information about a phone number associated with the mobile telecommunication device and/or information about the user of the mobile telecommunication device; the controller is configured to determine both the location and the identity of the mobile telecommunication device placed in the physical space; or the controller is configured to deduce and store in a database associations between a plurality of mobile telecommunication devices and/or users thereof and a plurality of geographic locations of localisation units, wherein these associations are obtained by combining the identifying information of the localisation unit sent by a mobile telecommunication device, the identifying information of that mobile telecommunication device sent by the mobile telecommunication device, as well as the geographic location information corresponding to said identifying information of the localisation unit retrieved from the database and optionally the further information about the mobile telecommunication units retrieved from the database.

9. System according to claim 1, wherein the controller is configured to send out a signal comprising the deduced and stored information about the geographic location of a plurality of mobile telecommunication devices and/or users thereof to the plurality of mobile telecommunication devices, and wherein the plurality of mobile telecommunication devices are configured to request and receive a signal comprising information about the location of a plurality of mobile telecommunication devices and/or users thereof for which the geographic location was deduced, and to display this information.

10. System according to claim 1, wherein the controller is configured to deduce and store information about the availability of a plurality of charging and localisation devices based on the information about the location of the plurality of devices for mobile communication for which the location was deduced and stored, and wherein the plurality of mobile telecommunication devices are configured to request and receive a signal comprising the information about the availability of a plurality of charging and localisation devices from the controller, and to display this information.

11. System according to claim 1, wherein if no information is received from a mobile telecommunication device during a period of time of a certain pre-set length, the association between a certain localisation unit and a certain mobile telecommunication device and/or user thereof is removed from the database.

12. System according to claim 1, further comprising an access control system configured to control the access to and departure from a geographical region wherein a plurality of physical spaces are arranged, wherein if the access control systems detects that a mobile telecommunication device enters or leaves the geographical region, an access signal is generated and sent to the controller, wherein if an association exists between the mobile telecommunication device and a localisation unit, the controller removes this association from the database upon receiving the access signal.

13. System according claim 1, wherein at least one of: the controller is configured to deliver location based services depending on the determined geographical location of the mobile telecommunication device, wherein the location based service includes controlling one or more environmental parameters of the physical space, including temperature and brightness; the location is determined based on which of the received broadcast signals has the largest signal strength, and/or on which broadcast signal is broadcast by the localisation unit which most recently started broadcasting; the system comprises a power source configured to provide both the charging device and the localisation unit associated with the charging device with power, wherein the localisation unit is powered via the charging device; or the localisation unit is configured for short-distance wireless communication and/or wherein the localisation unit is a Bluetooth beacon.

14. System according to claim 1, further comprising a housing, wherein the charging device and the localisation unit are both arranged in the housing, wherein the housing comprises at least a fastening element configured to fasten the housing in the physical space, wherein the fastening element is configured to fasten the housing to a workspace in the physical space, wherein the fastening element is configured to fasten the housing to or in a piece of furniture.

15. System according claim 1, wherein at least one of: the charging device is configured to wirelessly charge a mobile telecommunication device; the charging device comprises a power transmitter unit (PTU) for wireless power transmittal to a mobile communication device paced in close proximity and wherein the mobile telecommunication device comprises a power receiver unit (PRU) receiver for wireless power receipt; or the identifying information comprised in the signal broadcast by the localisation unit comprises a unique identifying code, including a universally unique identifying information code, uniquely identifying a localisation unit from among a set of localisation units.

16. System according to claim 1, comprising at least one of: a mobile telecommunication device configured to be wirelessly charged by the charging device, to wirelessly receive from a localisation unit the information signal comprising identifying information of the localisation unit and to send a further information signal comprising information representative of the identifying information received from the localisation unit wirelessly to a central registration system; or a central registration system configured to receive signals from a mobile telecommunication device and to send signals to a mobile telecommunication device, the central registration system being configured to receive the further information signals from respective mobile telecommunication devices and to determine the locations of the physical spaces that are occupied or unoccupied.

17. System according to claim 1, wherein the central registration system is further configured to determine and send an occupancy signal to a mobile telephone device, the occupancy signal being indicative of which physical spaces are currently occupied or unoccupied.

18. Combination of a charging device and localisation unit as defined according to claim 1, for use in a system according to claim 1 for determining the location of one or more occupied or unoccupied physical spaces.

19. Method of determining the location of one or more occupied or unoccupied physical spaces, each physical space provided with the charging device and the localisation unit of the system according to claim 1, the method comprising the following steps: coupling a mobile telecommunication device and the charging device when the mobile telecommunication device is placed in close proximity to the charging device; wirelessly transferring power from a charging device to the mobile telecommunication device; the charging device generating a trigger signal when a coupling between the charging device and a mobile telecommunication device is detected and/or when the charging device starts charging the mobile telecommunication device; upon reception of the trigger signal, the broadcasting, by the localisation unit, of an information signal comprising identifying information of the localisation unit to the mobile telecommunication device; determining the location of an occupied physical space upon detection of the coupling between the mobile telecommunication device and the charging device, wherein the location is determined based on the broadcast signal received by the mobile telecommunication device.

20. Method according to claim 19, comprising at least one of: determining that a space is occupied at the moment the coupling between a mobile telecommunication device and a charging device or the charging of the mobile telecommunication device is detected and to start determining the location of this space only after it has been determined that the space has been occupied; only broadcasting the information signal to the mobile telecommunication device if a mobile telecommunication device is coupled to the charging device with which the localization unit is associated; determining which of a plurality of signals broadcast by localisation units received by a mobile telecommunication device is a signal corresponding to a charging device in close proximity to the mobile telecommunication device, wherein the determination is made on the basis of signal strength and/or on the basis of which broadcast signal is broadcast by the localisation unit which most recently started broadcasting; determining which mobile telecommunication device is located at the occupied physical space based on identifying information of the mobile telecommunication device; sending information about the occupancy of physical spaces to mobile telecommunication devices which request this information; or determining that a physical space is no longer occupied based on the absence during a pre-set time of a signal from a mobile telecommunication device which was occupying the physical space.

* * * * *